F. G. HARBORD.
VISE.
APPLICATION FILED OCT. 20, 1919.

1,361,577.

Patented Dec. 7, 1920.

INVENTOR.
Frederick G. Harbord.
BY William J. Jackson
ATTORNEY.

UNITED STATES PATENT OFFICE.

FREDERICK G. HARBORD, OF PHILADELPHIA, PENNSYLVANIA.

VISE.

1,361,577.

Specification of Letters Patent.  Patented Dec. 7, 1920.

Application filed October 20, 1919. Serial No. 332,039.

*To all whom it may concern:*

Be it known that I, FREDERICK G. HAR-BORD, a citizen of the United States, residing at the city of Philadelphia, in the county of Philadelphia and State of Pennsylvania, have invented a certain new and useful Improved Vise, of which the following is a specification.

The present invention relates to a vise having jaws which are movable toward or away from one another in a rapid manner by means of a differential screw the threads of which are of unequal pitch and has for its leading object to provide a vise of this character which is of simple and efficient structure and which may be manufactured in a comparatively inexpensive manner. Other and further objects relate to the provision of a vise which may be used upon a work-bench or similar support and in the provision of general details of construction as will hereinafter more fully appear.

With these and other objects in view the invention consists of the improvements hereinafter described and finally claimed.

The nature, characteristic features and scope of the invention will be more fully understood from the following description taken in connection with the accompanying drawings forming part hereof and in which:—

Figure 1:
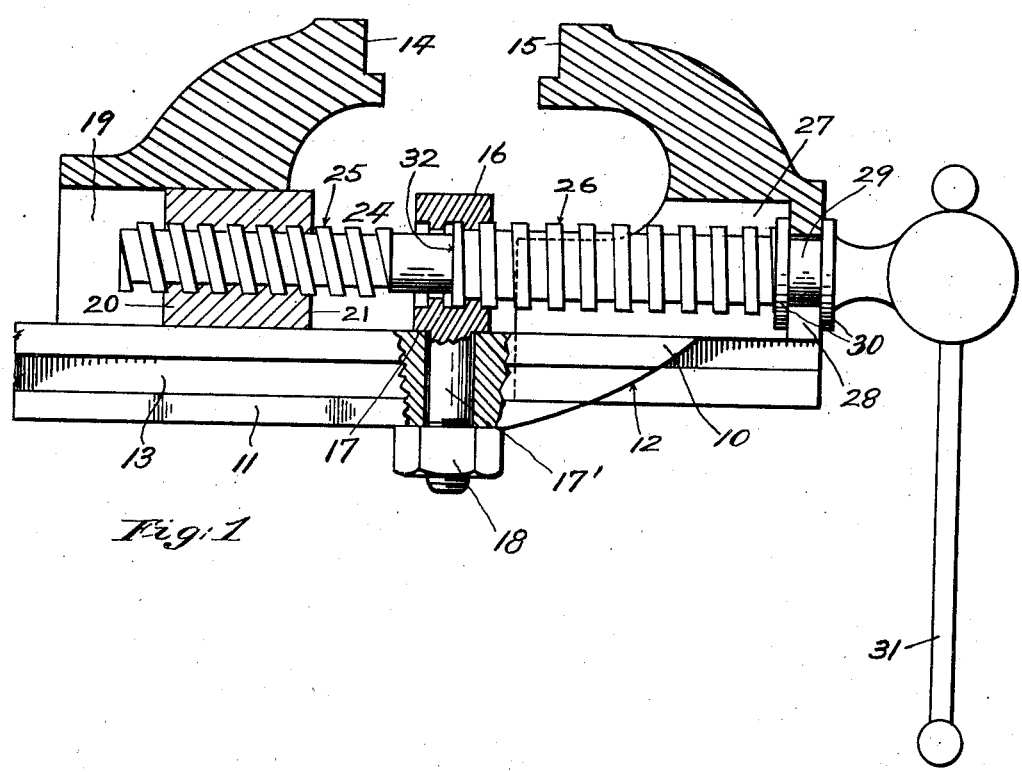
Figure 2:
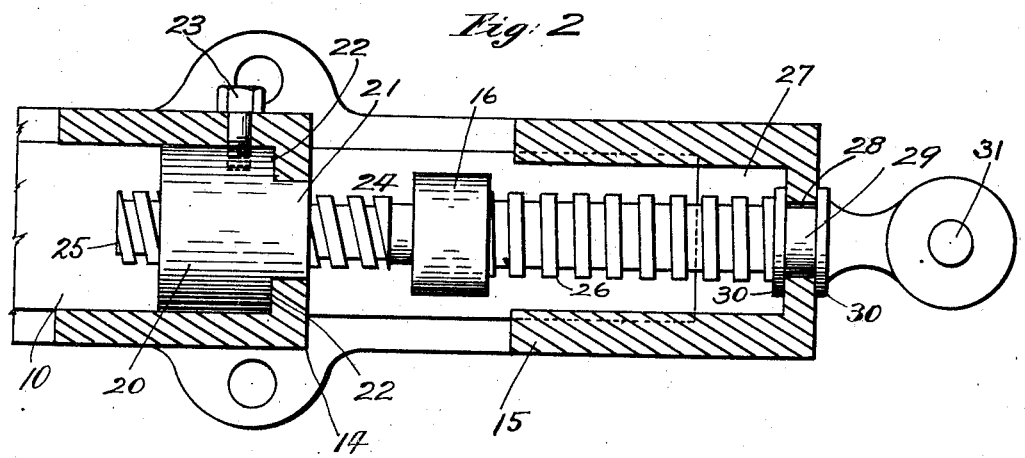

Figure 1, is a view in longitudinal section of a vise embodying features of the invention, and Fig. 2, is a view in horizontal section of the same.

In the drawings 10 designates a baseplate adapted to be secured to a work-bench or the like. The base-plate is provided with laterally disposed ears 11 which are apertured for bolt reception whereby said attachment may be effected. The rear of said base-plate is beveled off as at 12 for a purpose to presently appear. The said walls of said base-plate are grooved as at 13 within which grooves the jaws 14 and 15 have sliding movement toward or away from a fixed nut 16 carried by the base-plate 10. This nut is provided with a shoulder 17 which rests upon the base-plate upper surface and is provided with a screw-threaded shank 17' which passes through an aperture in said base-plate. A nut 18 is employed for engaging said shank whereby said nut 16 may be rigidly clamped with respect to said baseplate. The lower part of jaw 14 is hollow as at 19 and has fitted therein a nut 20. This nut is provided at its inner lower end with an extension 21 and a pair of shoulders 22. As shown in Fig. 2 the jaw 14 is provided with an apertured and flanged portion. The extension 21 penetrates the apertured portion thereof and the shoulders 22 abut against said flanged portion. A screw 23 is employed for securing the nut 20 in position. The differential screw is designated 24 and is formed of two screw-threaded portions 25 and 26. The former portion is of smaller diameter than is the portion 26 and the threads thereof have a greater pitch than do the threads of the portion 26. The portion 25 coöperatively engages the nut 20 of jaw 14 and the portion 26 coöperatively engages the nut 16 which is fixed to the baseplate. The jaw 15 is hollowed out as at 27 and is provided at its outer end with a slotted portion 28 within which is rotatably mounted the cylindrical part 29 of the differential screw. Collars 30 are located upon opposite ends of said part 29 which collars abut against the inner and outer walls of the jaw 15 to maintain said screw against endwise movement. The screw is provided with the usual form of vise-handle 31.

In operation the screw 24 is turned by means of the handle 31, to the right or left to cause the jaws to advance toward or recede from one another. Since the pitch of the threads upon the portion 25 are proportioned for quicker acting than are the threads of portion 26 it follows that the tendency of the former is to carry the jaw 14 toward or away from the nut 16 at a speed in excess of the speed of jaw 15. When the jaws are in closed position, that is abutting, the end 32 of portion 26 abuts against the extension 21 of nut 20.

What I claim is:—

1. In a vise the combination of an elongated, flat base-plate having extended laterally therefrom ears whereby said base may be clamped to the top of a work bench or the like, said base-plate being apertured for the passage of a shank therethrough, a nut mounted upon the top of said base-plate and provided with a threaded shank for passage through the aperture in said base, means for clamping said shank in place, a pair of jaws having tongued and grooved relation with and movable longitudinally along said baseplate of which one jaw is provided with a nut, a differential screw coöperatively engaging the respective nuts, means between the other of said jaws and one end of said screw to prevent end-wise movement of said screw and a handle for operating said screw.

2. A construction as described in claim 1 characterized by a hollow jaw, having a flanged and apertured portion to receive said nut which nut is provided with an extension and a pair of shoulders of which said shoulders abut against said flanged portions and the extension projects into said apertured portion and means for clamping said nut with respect to said jaw.

In witness whereof I have hereunto signed my name.

FREDERICK G. HARBORD.